Dec. 22, 1936.    R. K. LEE    2,065,081
VALVE OPERATING MECHANISM
Filed Jan. 25, 1934
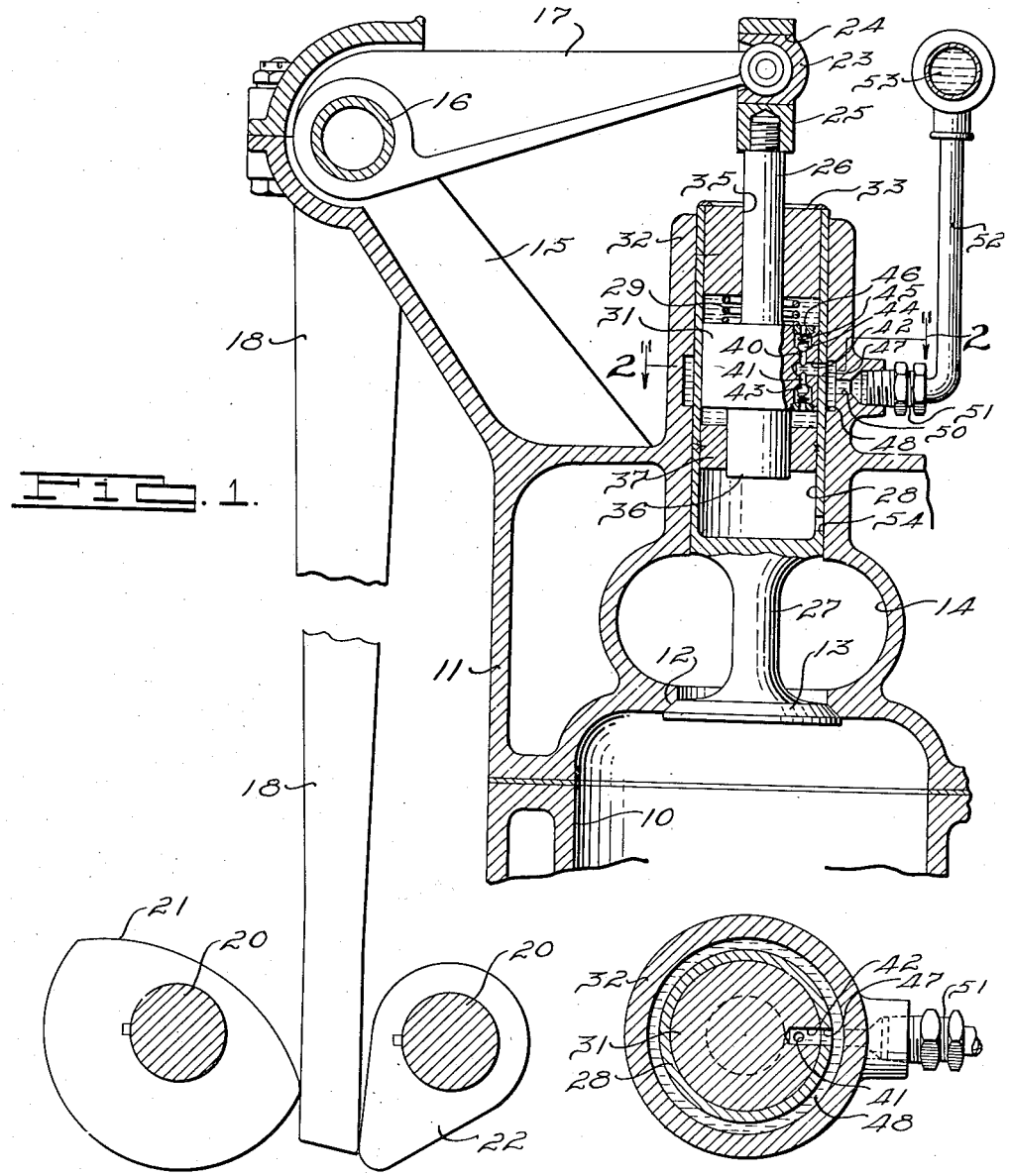
INVENTOR.
Roger K. Lee.
BY
Harness, Lind, Patie & Harris
ATTORNEYS.

Patented Dec. 22, 1936

2,065,081

UNITED STATES PATENT OFFICE 2,065,081

VALVE OPERATING MECHANISM

Roger K. Lee, Highland Park, Mich., assignor to Chrysler Corporation, Detroit, Mich., a corporation of Delaware Application January 25, 1934, Serial No. 708,191

10 Claims. (Cl. 123—90)

This invention relates to internal combustion engines and more especially to improvements in operating mechanism for the intake and exhaust valves of such engines.

The principal object of the invention is to improve the operation of valve actuating mechanism.

Another object is to provide for quietness in the operation of valve actuating mechanism.

Another object is to effect ease of the valve opening and closing operation.

Another object is to provide for ease in the opening and closing operations of valves adapted to be operated by positive acting valve actuating mechanism.

Another object is to provide means for yieldably urging a valve into seated position at constant or predetermined pressures.

Other objects and advantages will become apparent from the following description and appended claims.

For the purpose of illustrating the genus of the invention, a typical concrete embodiment thereof is shown in the accompanying drawing, in which:

Figure 1 is a central vertical section of a valve of an internal combustion engine together with positive acting valve actuating mechanism therefor; and Figure 2 is a section taken on the line 2—2 of Fig. 1.

Referring to the drawing, the numeral 10 indicates the wall of a cylinder of an internal combustion engine, 11 a cylinder head therefor provided with a valve seat 12, and 13 a valve adapted to establish or cut off communication between the interior of the cylinder and an intake or exhaust passage 14. The cylinder head 11 is provided with an arm 15 adapted to provide a bearing for a shaft 16 on which is fixed a pair of angularly arranged arms 17 and 18. The end of the arm 18 cooperates with a pair of cams 21 and 22 fixed to a pair of spaced cam shafts 20 rotatable in opposite directions at the same rate. The outlines of the cams 21 and 22 are such that when one cam is lifting the operating arm 18 the other cam allows such lifting movement while maintaining the cam surfaces of both cams in contact with the end of the operating arm 18. Since both operating arms 17 and 18 are fixed to the same operating shaft 16, oscillation of the operating arm 18 will cause the corresponding oscillation of the arm 17 for opening and closing movements of the valve 13. A slide member 23 is pivotally secured to the end of the operating arm 17 and is received in a slideway 24 formed in a block 25 threadably secured to an actuator stem 26. The valve 13 is provided with a stem 27 having an enlarged and hollow portion 28 forming a housing or chamber for the reception of a plunger 31 secured to the actuator stem 26.

A valve guide portion 32 is provided integral with the cylinder head 11 and receives the housing 28 to guide the valve 13 in its opening and closing movement. A closure member 33 is provided for the end of the housing 28 and is preferably secured thereto by welding. The closure member 33 is provided with an opening 35 in which the actuator stem 26 is adapted to closely fit but to permit sliding movement between the actuator stem 26 and the housing 28. The plunger 31 is preferably cylindrical in formation and is adapted to closely fit the housing 28 for sliding movement therein. The plunger 31 is provided with an axially extending portion 36 of greater cross section than the actuator stem 26 and is adapted to make a close sliding fit within a closure member 37 secured within the housing 28 at an intermediate point therein. The closure members 33 and 37 are spaced so as to permit relative movement between the plunger member 31 and the housing member 28. A coil spring 29 is interposed, in slightly compressed condition, between the plunger 31 and the end closure 33.

The plunger 31 is provided with longitudinally extending passages 40 and 41 leading from opposite end faces of the plunger to a common passage 42 extending radially outwardly to the periphery of the plunger. Each of the passages 41 and 42 is enlarged towards the end faces of the plunger 31 to provide a valve seat 43 for a ball valve 44 biased against the seat by a spring 45 maintained in compressed condition between the ball valve and an apertured holding ring 46 threaded into an end face of the plunger 31. The housing 28 is provided with a passage 47 adapted to communicate between the passage 42 and an annular port 48 provided approximately midway of the length of the valve guide 32 and arranged on the inner periphery thereof. A passage 50 communicates between the annular port 48 and a fitting and conduit 51 and 52 leading to a suitable source of fluid under pressure, indicated generally at 53. The interior of the chamber 28 between the closure member 37 and the pin 27 may be vented as indicated at 54 so that any leakage of the fluid under pressure between the projections 36 and the closure member 37 will not build up substantial pressures in the space within the housing 28 between the closure member 37 and the stem 27.

When the valve 13 opens the vent opening 54 drops below the end of the valve guide 32 so that any fluid leaking between the projection 36 and the closure member 37 will flow into the intake or exhaust passage 14.

When fluid is supplied under pressure from the source 53 to the conduit 52 and fitting 51, this fluid will flow through the passage 50, annular port 48, passage 47 and to the passages 40 and 41 lifting the ball valves 44 against the biasing action of the springs 45 causing such fluid to flow through the apertured holding rings 46 into the interior of the housing 28 and to both end faces of the plunger 31. As previously pointed out, the end face of the plunger 31 to which the passage 40 leads is of greater effective area than the opposite end face of the plunger to which the passage 41 leads. Since the fluid is supplied to the passage 42 at a predetermined pressure, the fluid acting upon both end faces of the plunger will be at the same pressure but the fluid acting upon the end face of greater effective area will cause the plunger to move away from the closure member 33 and towards the closure member 37. When the valve 13 is in closed position the differential areas of the end faces of the plunger 31 will cause movement of the valve 13 toward the valve seat 12 and cause the valve to seat at a pressure dependent upon the pressure of the fluid supplied from the source 53. The fluid supplied under pressure to the valve operated mechanism is preferably an oil or other lubricant so that it may serve to lubricate all relatively moving surfaces of the valve and actuating mechanism therefor. The conventional oiling system for the internal combustion engine may be employed as the source of fluid pressure for the valve and tappet mechanism therefor if desired. A pressure relief valve may be provide in conjunction with the source of fluid pressure for maintaining a constant pressure on the fluid supplied so that a constant seating pressure of the valve may be effected if desired. If desired, the housing 28 and plunger 31 could be reversed with the housing connected to the actuator stem 26 and the plunger connected to the valve stem 27 and a projection 36 extending through an end closure member 37 arranged at the opposite end of the housing from the valve 13. The illustrated embodiment is, however, preferred since it affords better guiding means for the valve 13 with respect to its seat 12. The spring 29, interposed between the upper end face of plunger 31 and the end closure 33, aids in moving the valve 13 to its seated position and slightly increases the seating pressure of such valve. This spring also slightly increases the ratio of the fluid above to that below the plunger 31 and tends to cause the valve 43 in passage 41 to assume seated position insuring quick opening of the valve 13. In the event of momentary decrease of pressure supplied to the valve, the spring 29 would close the valve 43 in passage 41 and trap fluid below the plunger 31 to insure opening of valve 13.

During the operation of the valve from the cam shafts 20, with the valve 13 in seated position, it will be noted that lifting the end of the operating arm 18 by the cam 22 will cause an increase in pressure of the fluid acting upon the end face of the plunger 31 to which the passage 41 leads. This increase in the fluid acting upon the lower face of the plunger 31 will cause the ball valve 44 in the passage 41 to seat and prevent retrograde flow of fluid back to the passage 42. The fluid trapped in this manner will, by reason of small amounts of air in the fluid, cushion the action of the valve upon opening movement of the same. There is preferably no intention to include air with the oil but ordinarily small amounts of air will be present in the oil giving a small degree of cushioning action to the fluid. The ball valve 43 in passage 41 will remain seated during opening movement of valve 13. At the end of the opening movement of the valve 13 and at the point of change in direction of movement of the valve to that of closing movement when the cam 22 has lifted the operating arm 18 to the full extent and cam 21 starts to lift the end of the operating arm 18, there will be an increase in the pressure of the fluid acting upon the end face of the plunger 31 to which the passage 40 leads. This will be due to the inertia of the valve 13 and parts connected directly thereto. This increase in the pressure of the fluid acting upon the upper end face of the plunger 31 will cause the ball valve 44 in the passage 40 to seat so that the fluid thus trapped will again cushion the action of the valve in changing direction of movement. The ball valve in the passage 40 remains seated until the valve 13 has been retracted to seating position. When the plunger 31 is reciprocated in response to the lifting action of either the cams 22 or 21, the ball valve 44 in the passage 41 or 40 respectively will be caused to assume seated position and remain in such seated position until the movement of opening or closing the valve has been completed.

During the operation above described there will be a slight leakage of fluid around the plunger 31.

As many changes could be made in the above construction and many apparently widely different embodiments of this invention could be effected without departing from the scope thereof, it is intended that all matter contained in the above description or shown in the accompanying drawing shall be interpreted as illustrative and not in a limiting sense.

What is claimed is:

1. A valve mechanism comprising a pair of axially aligned valve stems, a housing on one of said valve stems, a plunger fixed to the other stem and arranged in said housing, said housing providing a fluid pressure receiving enclosure at each end face of said plunger, a source of fluid under pressure, and means for introducing fluid from said source into said housing between both end faces of said plunger and parts of said housing to oppose relative axial movement of said stems both toward and away from each other.

2. A valve mechanism comprising a pair of axially aligned valve stems, a valve on one of said stems, a housing on one of said stems, the stem other than the one carrying the housing projecting through one end of said housing and having a plunger fixed thereon and arranged in said housing, a projection of greater cross-sectional area than the stem projecting through the end of said housing being provided on the opposite face of said plunger, a source of fluid under pressure, and means for introducing fluid from such source into said housing between both end faces of said plunger and parts of said housing, the effective area of the end face of said plunger carrying one of said stems being greater than the effective area of the end face of the plunger carrying the projection extending through one end of the housing for effective relative movement of said stems toward one another.

3. In combination, a valve, a valve seat therefor, a valve stem movable axially for opening and closing said valve with respect to said valve seat, positively acting valve actuating means for moving said valve both toward and away from said valve seat and including an element reciprocating on an axis containing the axis of movement of said valve stem, a fluid medium providing a drive between said element and said stem for opening and closing said valve, and yieldable means connecting said element and said valve stem for cushioning the action of said valve in one direction of its movement.

4. In combination, a valve, a valve seat therefor, a valve stem movable axially for opening and closing said valve with respect to said valve seat, a housing fixed to said stem, a valve actuator including an element movable axially with respect to its own axis and with respect to the axis of said valve stem, a plunger fixed to said element and disposed in said housing, a source of fluid under pressure, means for introducing fluid under pressure from said source between both end faces of said plunger and parts of said housing to cushion the action of said valve in its movement both toward and away from said valve seat.

5. In combination, a valve, a valve seat therefor, a valve stem movable axially for opening and closing said valve with respect to said valve seat, a housing fixed to said stem, a valve actuator including an element movable axially with respect to its own axis and with respect to the axis of said valve stem, a plunger fixed to said element and disposed in said housing, a source of fluid under pressure, means for introducing fluid under pressure to the interior of said plunger, passages extending from the interior of said plunger to both end faces of the plunger for introducing fluid under pressure to both end faces of the plunger, and means in said passages for preventing return flow of fluid from either end face of the plunger to the interior thereof when the pressure of the fluid exerted upon such end face of the plunger exceeds the pressure of the fluid in the interior of the plunger.

6. In combination, a valve, a valve seat therefor, a valve stem movable axially for opening and closing said valve with respect to said valve seat, a housing fixed to said stem, a valve actuator including an element movable axially with respect to its own axis and with respect to the axis of said valve stem, a plunger fixed to said element and disposed in said housing, means for reducing the effective area of the end face of said plunger arranged toward said valve to a less value than the effective area of the opposite end face of said plunger, a source of fluid under pressure, means for introducing fluid under pressure from said source to the space within said housing between both end faces of the plunger and parts of the housing whereby the differential areas of the end faces of said plunger will effect relative movement of said element and valve stem to move said valve toward said valve seat, and means in said plunger for checking return flow of fluid from either end face of said plunger to said source of fluid under pressure when the pressure of the fluid exerted on the end face of such plunger exceeds the pressure of the fluid at said source.

7. In an engine valve operating mechanism, a valve, and valve actuating means including a driving element for moving said valve alternately toward its open and closed positions, said valve actuating means including a fluid forming an operating intermediary between said valve actuating means and said valve, a driven element connected to said valve coaxially with said driving element, one of said elements providing a housing for said fluid, said fluid acting to transmit actuating movements of said driving element to said valve for moving said valve toward said positions.

8. In an engine valve operating mechanism, a valve, a driving element, means including an element positively reciprocated by said driving element and adapted to move said valve, one of said elements providing a housing for a liquid medium adapted to operably connect said elements, means connecting said valve with said reciprocated element, and means for moving said elements for reciprocation along a common axis.

9. In an engine valve operating mechanism, a valve element, a driving member, means including a second element positively reciprocated by said driving member and adapted to move said valve, and means connecting said elements and including a cylinder drivingly connected to one of said elements and a piston drivingly connected to the other of said elements, said piston operating within said cylinder, said cylinder having end walls spaced from said piston to provide a pair of chambers separated by said piston, and a fluid medium within said chambers providing a two-way drive between said elements.

10. In an engine valve operating mechanism, a valve element, a driving member, means including a second element positively reciprocated by said driving member and adapted to move said valve, means connecting said elements and including a cylinder drivingly connected to one of said elements and a piston drivingly connected to the other of said elements, said piston operating within said cylinder, said cylinder having end walls spaced from said piston to provide a pair of chambers separated by said piston, and a fluid medium within said chamber providing a two-way drive between said elements, and means for supplying said chambers with said fluid medium, said fluid supply means including two check valves carried by said piston, one of said valves being associated with one of said chambers and the other of said valves being associated with the other chamber.

ROGER K. LEE.